Inventor
Walker A. Parrish, JR
By Arthur Nelson
Attorney

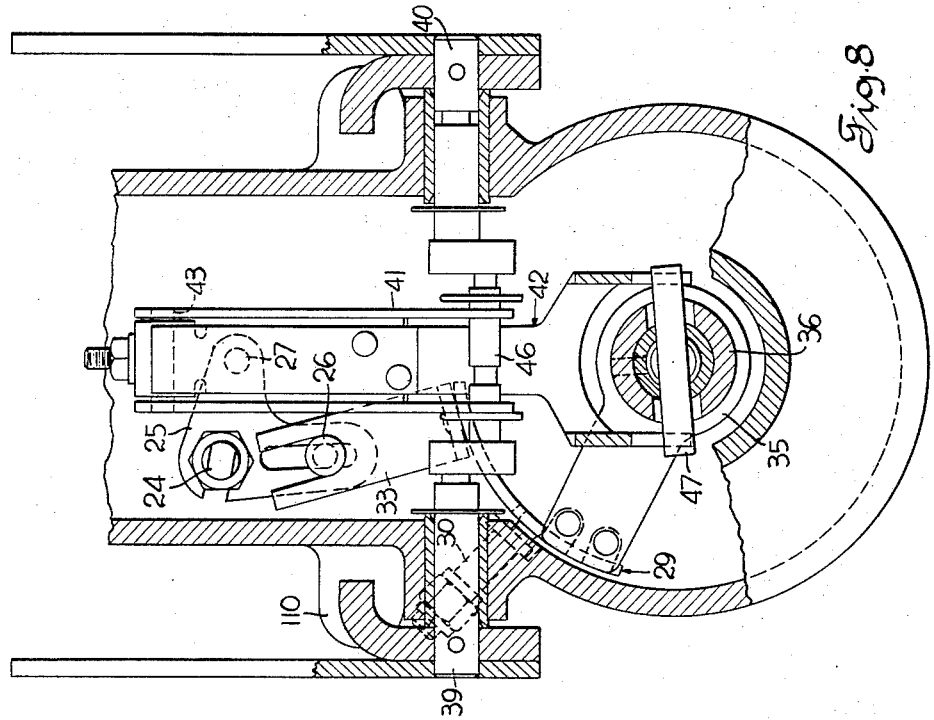
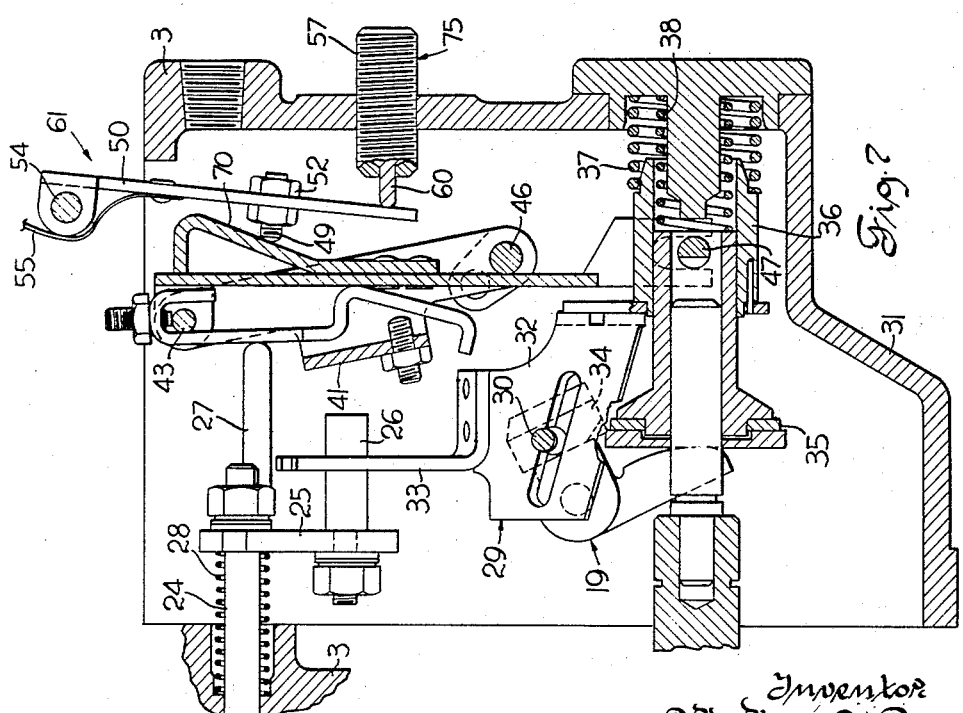

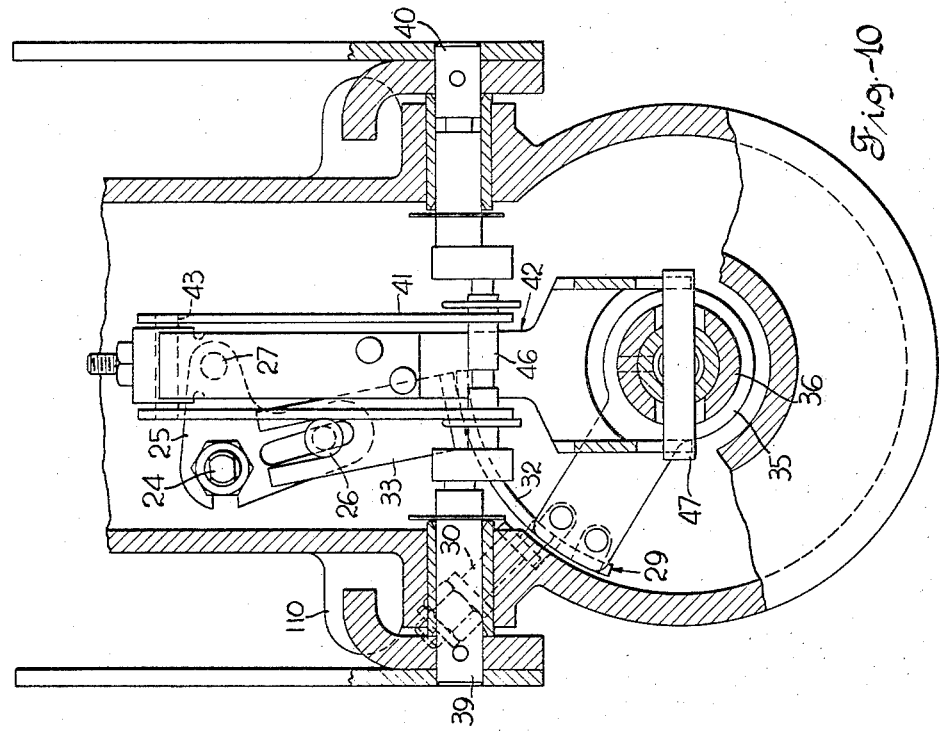
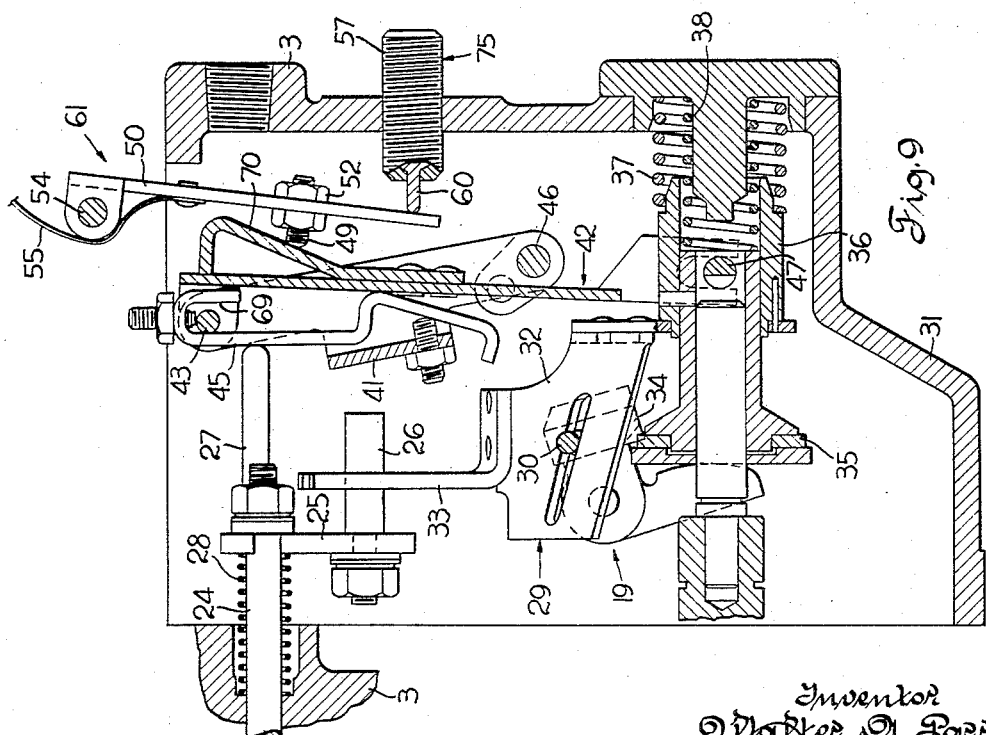

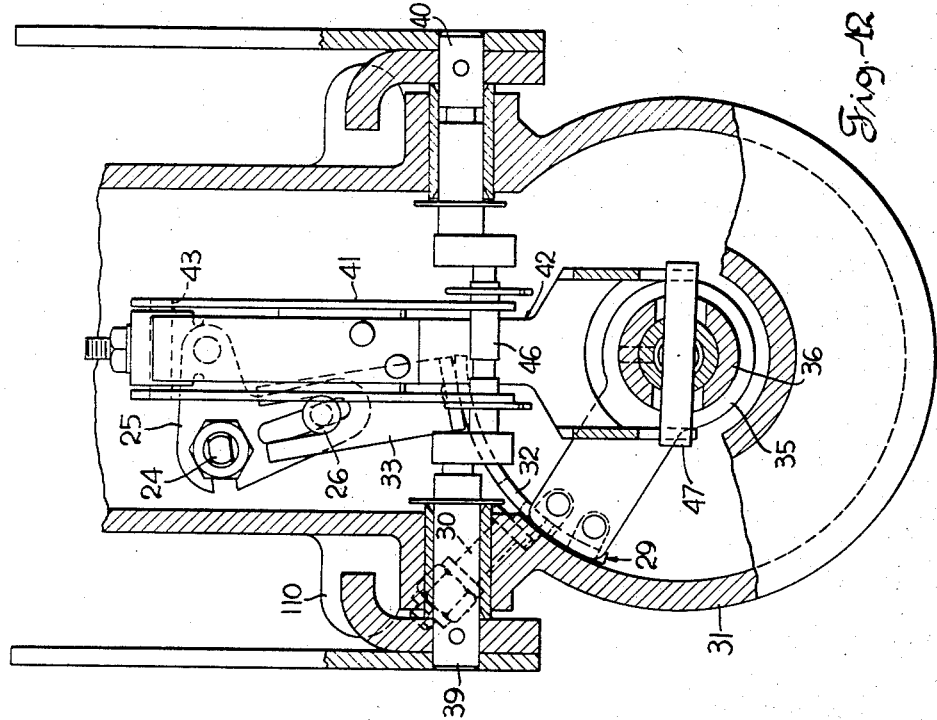
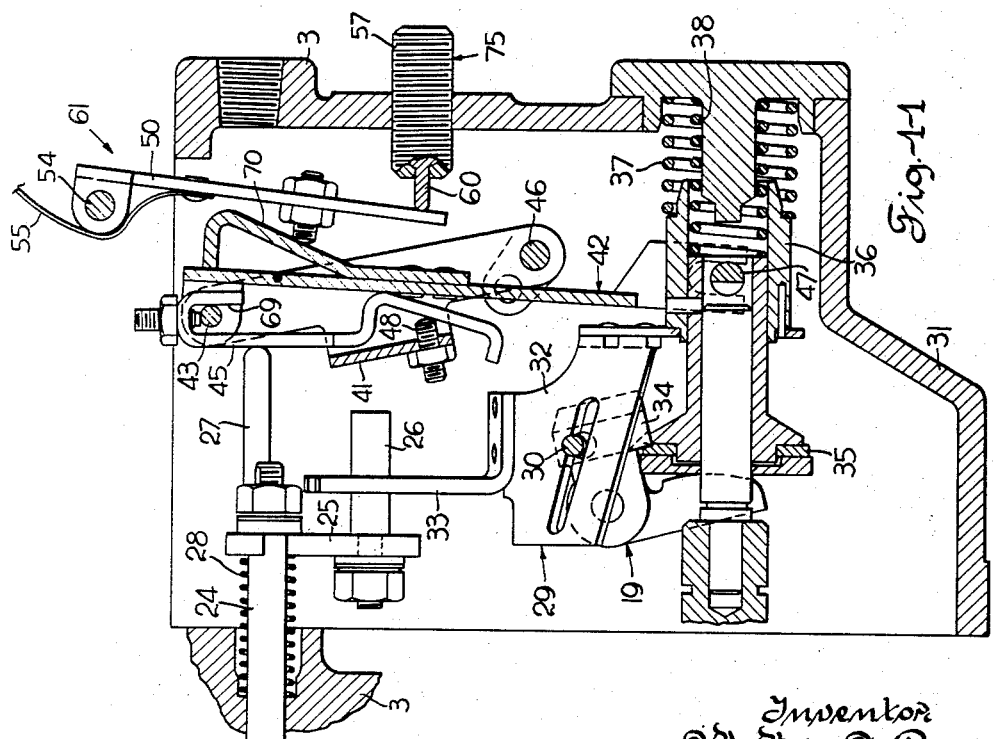

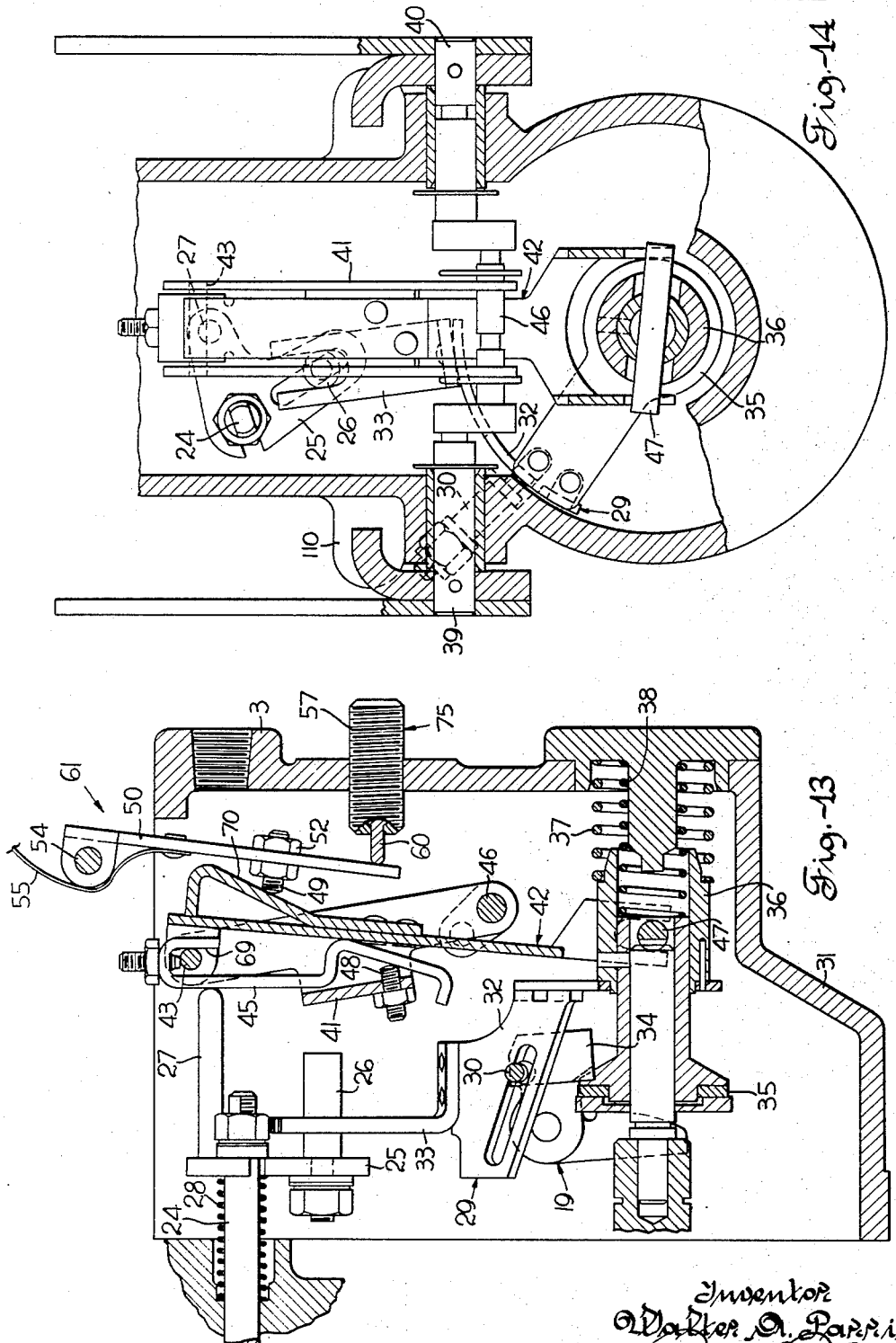

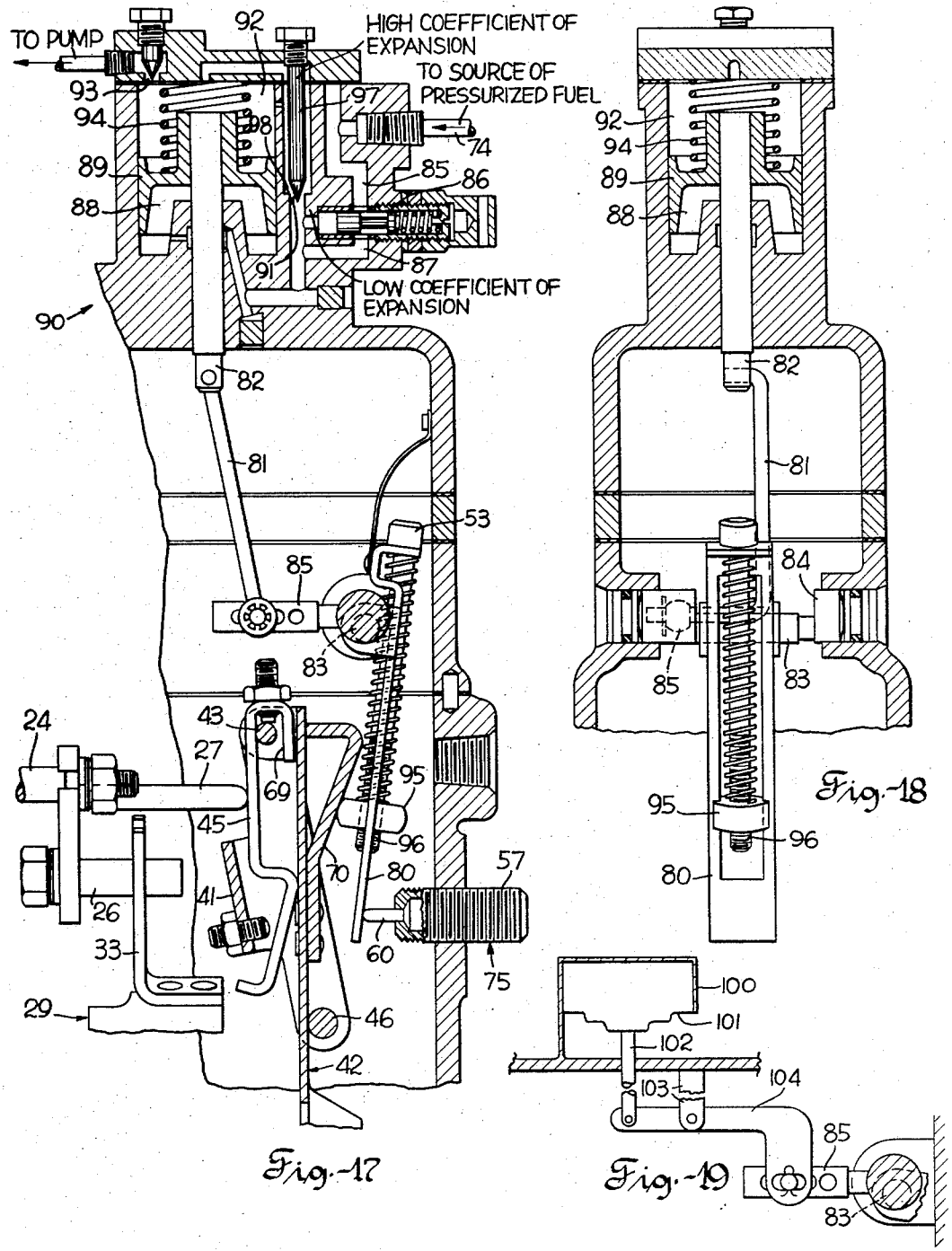

United States Patent Office 3,421,486
Patented Jan. 14, 1969

3,421,486
FUEL INJECTION CONTROL
Walter A. Parrish, Jr., Homewood, Ill., assignor to Allis-Chalmers Manufacturing Company, Milwaukee, Wis.
Filed Apr. 10, 1967, Ser. No. 629,625
U.S. Cl. 123—139           10 Claims
Int. Cl. F02m *39/00;* F02d *1/04;* F04b *13/02*

ABSTRACT OF THE DISCLOSURE

A fuel delivery control responsive to speed and a fuel or an air condition to provide a timing and quantity control for fuel delivery to an internal combustion engine.

---

This invention relates to a fuel control device on an internal combustion engine and more particularly to a fuel delivery rate control and timing device.

Internal combustion engines require some control means for regulating the speed of the engine and regulating the torque output delivered by the engine. The control mechanism covered in this disclosure is more particularly designed for use with a compression ignition engine. The mechanism provides a rapid increase in fuel delivery with decrease in speed when the engine is operating at high idle and a load is placed on the engine. The increase in fuel delivery continues to a predetermined engine speed known as rated speed.

It is also necessary to maintain a stable condition for engine operation below rated speed by an increasing torque as a load is placed on the engine. Accordingly, the torque output from the engine is gradually increased with a decreasing speed as an increase in load is applied to the engine. Referring to the engine speed-fuel delivery curve, the torque increase is a function of fuel delivery to the engine as shown on the curve. The relationship that fuel delivery to the engine bears to torque output is a direct relationship and is shown by the same family of curves. The speed-fuel delivery, or speed-torque curve as illustrated on the graph illustrates the operating characteristics for an engine operating with the device as described below. The speed of the engine is indicated by the abscissa and the fuel delivery rate, or torque, measured in fuel units delivered per injection to the engine combustion chambers is indicated as the ordinate.

The speed torque graph illustrates rated torque and rated speed which is a load rating of the engine which should not be exceeded for any prolonged period of time. It is, however, desirable for an engine to operate with torque loading in excess of the torque rating and rated speed. When additional load is applied to the engine, additional fuel is delivered to the engine as the speed of the engine decreases. The additional fuel provides additional torque as the speed is decreased in order to provide a stable operating condition for the engine. As the load applied to the engine is increased, the speed of the engine will continue to decrease to a point which is considered peak torque, below which the engine output will no longer provide an increasing torque to overcome the added load. Below this point the engine operation is unstable and continued increase in load will cause the engine to stall. An engine is designed for a particular speed torque characteristic to meet the load requirements. Accordingly, this engine is provided with a governor for controlling the speed of the engine which operates in conjunction with a control mechanism which provides torque control for increasing torque when a load is applied to the engine. The point indicated as rated speed on the curve indicates a change in the rate of fuel delivery and is known as the knee of the curve and the torque control range is considered to be the portion of the curve between the point of rated speed and peak torque. This is usually the operating range for an internal combustion engine.

It may also be desirable to control the fuel delivery rate in response to other conditions such as fuel heat value, or barometric pressure, manifold pressure, etc.

Ordinarily a fuel injection engine operating on a conventional fuel will have a significant power change when operated on a fuel of substantially different specific gravity. The specific gravity of fuels and the density of the fuel bear a definite relationship to the heating value of the fuel. It is also apparent that the fuel viscosity and the heating value of a fuel have the same relationship. Since the density, the viscosity and the heating value have the same relationship, the relationship of heating value may be sensed by the variation in viscosity and this relationship may be used to control the quantity of fuel which is delivered to the engine. Accordingly, this invention discloses a density sensing device.

The power output of an engine is largely determined by the amount of air taken into the combustion chamber. Accordingly, a modification is provided for sensing barometric or manifold pressure and providing a partial control for fuel delivery.

Accordingly, this invention provides a speed sensing device which is used to control the timing of the fuel delivery and the quantity of fuel delivery for each stroke of a compression ignition engine. Simultaneously with the control of quantity and timing of fuel a variable condition such as fuel density and heating value, or a pressure condition is also used to control power output at the engine.

It is an object of this invention to provide a mechanism to control the rate of fuel delivery to a compression ignition engine.

It is another object of this invention to provide a mechanism operating in conjunction with a centrifugal governor to control the fuel delivery rate and timing of fuel for a compression ignition engine.

It is a further object of this invention to provide a fuel delivery control mechanism and timing mechanism operating in conjunction with a speed responsive device and a condition responsive device for controlling the fuel delivery rate and the timing of the fuel delivery for an internal combustion engine.

It is a further object of this invention to provide an articulated mechanism operating in conjunction with a speed responsive device to control the fuel delivery rate and the timing of fuel delivery to an engine.

The objects of this invention are provided by means of a centrifugal governor which operates a reciprocating element to generate reciprocal and rotative movement. The rotative movement is used to slidably move a control sleeve axially on the plunger of the fuel pump. The reciprocation of the control sleeve determines the point of port closing and consequently the earliest point of a pumping action which causes injection in a cylinder of the engine.

The reciprocal movement of the governor operating the reciprocating element is transmitted through an articulated mechanism which operates as a lever having a first pivotal axis which determines the fuel rate over the speed control range of the speed torque curve and also a second pivotal axis which provides a slower rate of fuel delivery providing a gradual torque increase with a decrease in engine speed.

The fuel delivery rate is decreased for an additional decrease in engine speed by a third pivoting mechanism which comes into operation in response to additional movement from the speed responsive element of the governor. The combination of levers produces a control which provides an increasing torque with a decreasing speed and maintains stability of the engine. It is further desirable to provide a fuel control which will compensate for loss in power output of the engine when the engine is using one of a multiple of different fuels. This control is provided by a viscosity sensing device which changes the rate of fuel delivery to deliver effectively the same amount of energy in the fuel to the cylinder during injection to provide substantially a constant power output regardless of the specific gravity or heat value of the fuel used. Compensation may also be provided for barometric or manifold pressure changes.

The fuel delivery rate is controlled by rotating the control sleeve about a central axis in response to the reciprocal movement of the speed responsive element of the governor which is transmitted through the articulated mechanism to provide a fuel quantity control.

The preferred embodiments of this invention are illustrated in the attached drawings.

FIG. 7 is a cross section view of the fuel delivery control mechanism in the rated speed position.

FIG. 8 is a cross section view taken at right angle to FIG. 7 showing the fuel delivery rate control mechanism.

FIG. 9 is a cross section view of fuel delivery control mechanism in the peak torque position.

FIG. 10 is a cross section view taken at right angle to FIG. 9 with the fuel delivery control mechanism in the peak torque position.

FIG. 11 is a cross section view of the fuel delivery control mechanism with the articulated mechanism pivoting as a unit.

FIG. 12 is a cross section view taken at right angles to FIG. 11.

FIG. 13 is a cross section view of the fuel delivery control mechanism when the engine is operating at point H in FIG. 2 where the starting boost piston begins to move.

FIG. 14 is a cross sectional view taken at right angles to FIG. 13.

FIG. 17 is a cross section view of a viscosity responsive device and related linkage.

FIG. 18 is a cross section view taken at right angles to FIG. 17.

FIG. 19 is a schematic illustration of a pressure responsive device.

The fuel delivery control mechanism disclosed is designed to operate with a compression ignition engine, a fuel injection pump is used to inject fuel to each of the plurality of cylinders. The fuel injection pump plunger reciprocates to pump fuel and rotates to distribute fuel. Positioned around the plunger is an axially slotted control sleeve which controls the flow of fuel from the supply chamber to the pumping chamber and also controls the length of effective pumping stroke. The relationship of the sleeve to the path executed by the inlet port of the plunger is controlled by the governor to achieve the following characteristics. When the sleeve is raised the port closing is delayed which tends to decrease the effective pumping stroke. Conversely, when the sleeve is lowered the closing of the port is advanced which tends to increase the effective pumping stroke.

When the sleeve is rotated in the direction of plunger rotation the port opening is delayed which tends to increase the effective pumping stroke. Conversely, rotating the sleeve in the direction opposite plunger rotation advances the port opening and tends to decrease the effective pumping stroke.

This pump when controlled by the described governor will enable the quantity of fuel injected to advance as the engine speed increases to benefit engines which require this characteristic. The advance of fuel delivery will be achieved by lowering the sleeve as the speed increases to advance the port closing. Engine speed and torque which is a function of the quantity of fuel injected will be controlled by sleeve rotation which in turn will vary the effective pumping stroke.

The movement of the control sleeve is initiated by a speed responsive device such as a centrifugal governor. The centrifugal governor is driven by a drive shaft from the internal combustion engine. The drive shaft is illustrated in FIG. 1 which drives a gear pump, the fuel injection pump, and the centrifugal governor.

Figure 1:
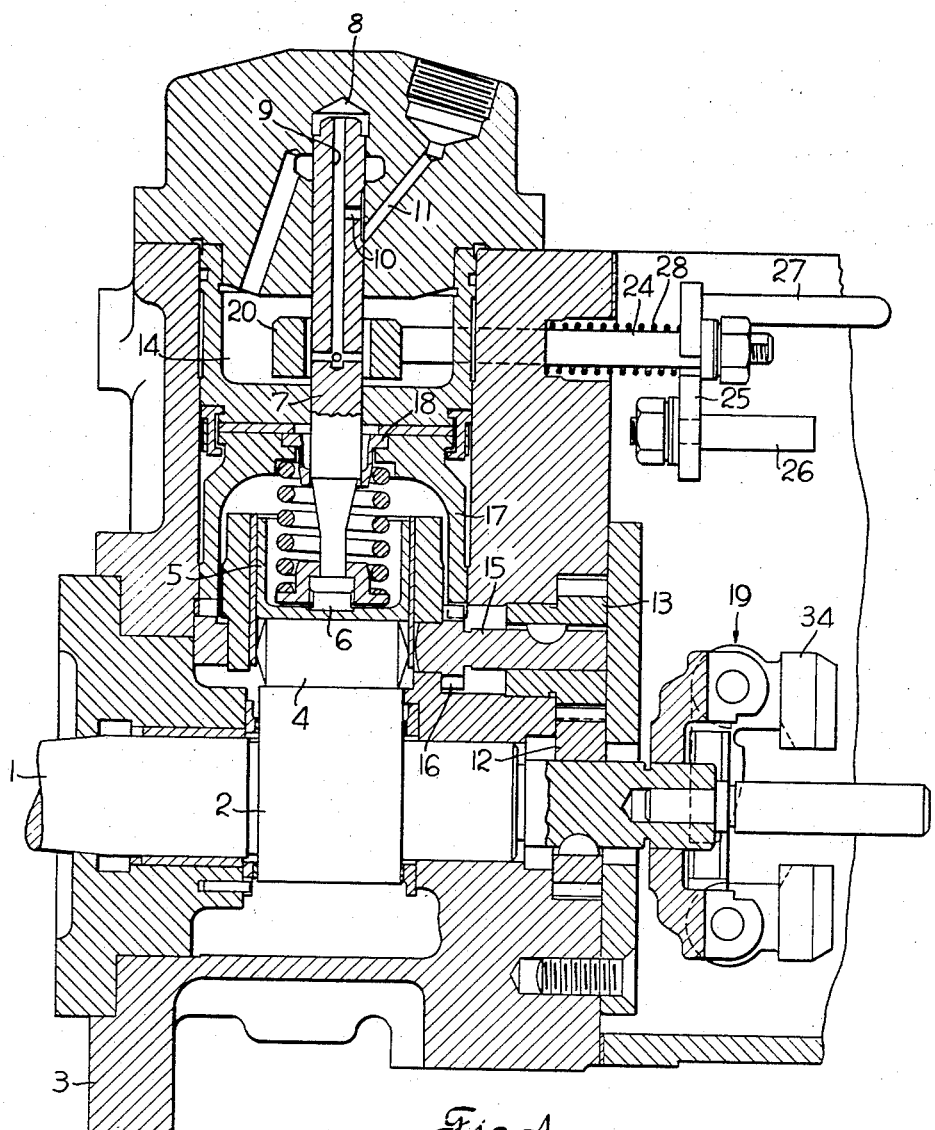
FIG. 1 illustrates a cross section view of a drive shaft driving a fuel injection pump, a gear pump for pressurizing fuel for delivery to the injection pump, and a centrifugal governor.

Referring to FIG. 1, the drive shaft 1 is driven by the engine. The cam 2 is formed integral with the shaft. The shaft is rotatably mounted in the housing 3 and rotates against a roller 4 operating a cam follower 5. A spacer 6 is placed intermediate the cam follower 5 and the plunger 7. The plunger reciprocates vertically in response to rotation of the cam 2 and pressurizes fuel in the high pressure chamber 8. The chamber 8 is in communication through the axial passage 9 and the radial passage 10 sequentially to fuel delivery passages 11 to each of the plurality of cylinders in the internal combustion engine.

Simultaneously with the reciprocating motion of the plunger 7 a rotating motion is also applied to the plunger 7. The rotative drive for the plunger is also provided from the drive shaft 1. The drive shaft 1 rotates a drive gear 12 which is keyed to the shaft. Drive gear 12 rotates the driven gear 13 which forms a gear pump to pressurize fluid which is delivered to the supply chamber 14. The driven gear 13 is rotatably supported within the housing and is keyed to a shaft 15 which drives a pinion 16. The pinion 16 drives the face gear 17 which is connected to a drive sleeve 18 which rotatably drives the plunger 7. It can be seen that the drive shaft provides a motive force for reciprocating the plunger 7 and also rotating the plunger to distribute the high pressure fluid from the chamber 8 sequentially to each of the plurality of fuel delivery passages for fuel injection to a compression ignition engine.

The drive shaft 1 also extends into the housing and rotatably supports a centrifugal governor 19. The centrifugal governor will be described subsequently.

The control sleeve 20 controls the quantity of fuel and the timing of the fuel injection. The control rod 24 is supported in the housing 3 and has a socket 21 receiving a ball 22 having a stem fastened to sleeve 20.

The ball 22 and attached control sleeve 20 will respond to both axial and rotary motion of the control rod 24. The control sleeve 20 rotation is produced by axial displacement of the control rod 24. Vertical position of the sleeve 20 is achieved by rotating control rod 24 about its axis. The governor plate 25, timing pin 26 and control finger 27 are rigidly fastened to the control rod 24 to transmit rotary motion produced by a slotted plate 29 and to transmit axial motion produced by motion of the governor yoke assembly to control sleeve 20.

The timing of fuel injection is controlled by a rotary motion generated by the centrifugal governor 19. The timing adjusting screw 30 is rigidly fixed to the governor housing 31 and freely engages an angle slot provided in the slotted plate 32. A rotary motion is imposed on the slotted plate by this arrangement as it responds axially to the speed changes. A timing fork 33 is rigidly fixed to the plate 32 and transmits plate rotary motion to the timing pin 26 which in turn through the governor plate 25 rotates control rod 24 producing a vertical displacement of the control sleeve 20.

Angular displacement of the slotted plate 32 is a function of axial displacement of the slotted plate 32 and the angle of the angled slot. Each may be varied. A manual timing adjustment can be made by turning the timing adjusting screw 30 on its main axis. The diameter of this screw which engages and guides a slotted plate 32 is eccentric to the main axis of the screw. Manual rotation of the screw will thus rotate the slotted plate 32 slightly. This adjustment may be used to assure uniformity of the initial timing adjustment.

Referring to the governor 19, the fly weights 34 are driven by the drive shaft 1. As the fly weights 34 rotate a centrifugal force is generated tending to accelerate them radially. This force is transmitted through the fly weight fingers and thrust bearing 35 to the shifter 36 and the slotted plate 32. The impending motion of the shifter 36 and slotted plate 32 is opposed by the spring force of springs 37 and 38 which make the equilibrium position of the shifter 36 solely a function of pump speed. By utilizing this equilibrium position, the shifter 36 as a speed sensing device, the timing fork 33 to signal the radial position of the shifter 36, and slotted plate 32 to timing pin 26, the control rod 24 can be made to rotate and to move the control sleeve 20 vertically.

The slotted plate 32 and shifter 36 are rigidly fastened together and move as a unit both axially and radially.

As the speed increases, the shifter 36 moves axially toward the springs 37 and 38 until a new position of equilibrium is reached. This axial movement of the shifter 36 and slotted plate 32 in cooperation with the adjusting screw 30 in the angle slot will rotate the slotted plate 32 and timing fork 33. This rotation is transmitted via timing pin 26 to the governor plate 25 and the control rod 24. The control socket 21 attached to the control rod 24 transmits this rotation to the control ball 22 and control sleeve 20 thus lowering the control sleeve 20. Port closing or beginning of injection will now occur earlier in the cycle.

A speed regulation of the internal combustion engine is controlled through a throttle shaft which provides an initial setting which is manually controlled. Once the throttle shaft is set, the centrifugal governor will substantially maintain the speed setting.

The throttle shaft 39 and shutoff shaft 40 are coaxially mounted on the governor housing 31. The shutoff clip lever is fastened to the shutoff shaft 40. The shutoff clip lever rotates with the shutoff shaft 40. The throttle shaft 39 and shutoff shaft 40 are free to rotate independently of one another. At the outer end of each shaft, shutoff shaft 40 and throttle shaft 39 are affixed levers and stops which limit and control the angular movement of each shaft.

The governor yoke assembly is comprised of a torque link 41 and a yoke 42 rotatably hinged by a pin 43. A spring 28 is compressibly positioned between the housing 3 and the governor plate 25.

This spring biases the control finger to an engaging position with the torque plate 45 to maintain the torque plate in a contacting position with the shaft 43 and yoke 42. The force of the spring will bias the governor yoke 42 to engage the shaft 46 and cause the torque plate 45 and yoke 42 and torque link 41 to initially rotate as a unit about a pin 46.

The shifter pin 47 engages slots in the lower end of the governor yoke 42 and transmits axial motion of the shifter 36 and slotted plate 32 to governor yoke assembly.

At an equilibrium position between fly weights 34 and governor springs 37 and 38, rotation of throttle shaft 39 will displace pin 46. This will force the governor yoke assembly to rotate about the shifter pin 47. The peak torque plate 45 at the upper end of the governor yoke 42 transmits this rotation to control finger 27 as an axial movement which will rotate control sleeve 20 so the required amount of fuel may be delivered to the engine. Consider the throttle shaft to be held in this position thus fixing the position of the pin 46. A decrease in engine speed, in other words a load increase will make the shifter 36 move to a new equilibrium position away from the governor springs 37, 38. This movement will be transmitted by shifter pin 47 to slots in the lower end of the governor yoke 42. The governor yoke assembly will rotate as a unit on the pin 46. The control finger 27 in contact with the peak torque plate 45 at the end of the governor yoke 42 will be moved toward an increased fuel position which will tend to reestablish the original speed.

The torque plate 45 is retained on the governor yoke 42 by the pin 43. The spring 28 biases the peak torque plate 45 to an engaging position with the shaft 43 and the yoke 42 at point X FIG. 5. This arrangement provides for an amount of governor yoke rotation relative to the torque link 45 which is limited by the clearance between the torque adjustable screw 48 on the torque link 41. This rotation occurs when the yoke rotates about the fuel stop adjusting screw 49 on the fuel stop lever 50.

The entire fuel stop assembly is comprised of hinged plate 50, adjusting screw 49 and spring 55 and the adjusting nut 52. The contact point of the adjusting screw 49 may be adjusted to a higher or lower elevation than that of the control finger 27 by turning the adjusting bolt 53 shown on FIG. 17.

The entire fuel stop assembly is rotatably mounted on pivot pin 54 which is rigidly fixed to the governor housing 3. A fuel stop spring 55 serves to maintain a constant contact between the fuel stop assembly 61 and the starting boost assembly 75.

The starting boost assembly 75 is comprised of a starting boost body 57, a spring adjusting screw 58, spring 59 and piston 60. By turning the spring adjusting screw 58 in starting boost body 57, various spring loads may be imposed on the piston 60.

Proper setting of this spring load will then permit piston 60 to move against the spring 59 at some desired load imposed by the hinged plate 50. In normal operation, the starting boost assembly acts as a fixed non yieldable stop which is adjusted by turning starting boost body 57 in governor housing 3.

Consider the throttle shaft 39 as being in a counterclockwise setting. This will be called full throttle setting. Also consider the engine is sustaining no load. Under these conditions the governor yoke assembly is rotated about the fulcrum of the pin 46 by the shifter 36 and shifter pin 47 bringing about an equilibrium between the fuel delivery and the shifter position at high idle speed under no load. This position is illustrated on the speed torque or speed fuel delivery curve illustrated in FIG. 2. Point A on the curve is the high idle position.

Figure 6:
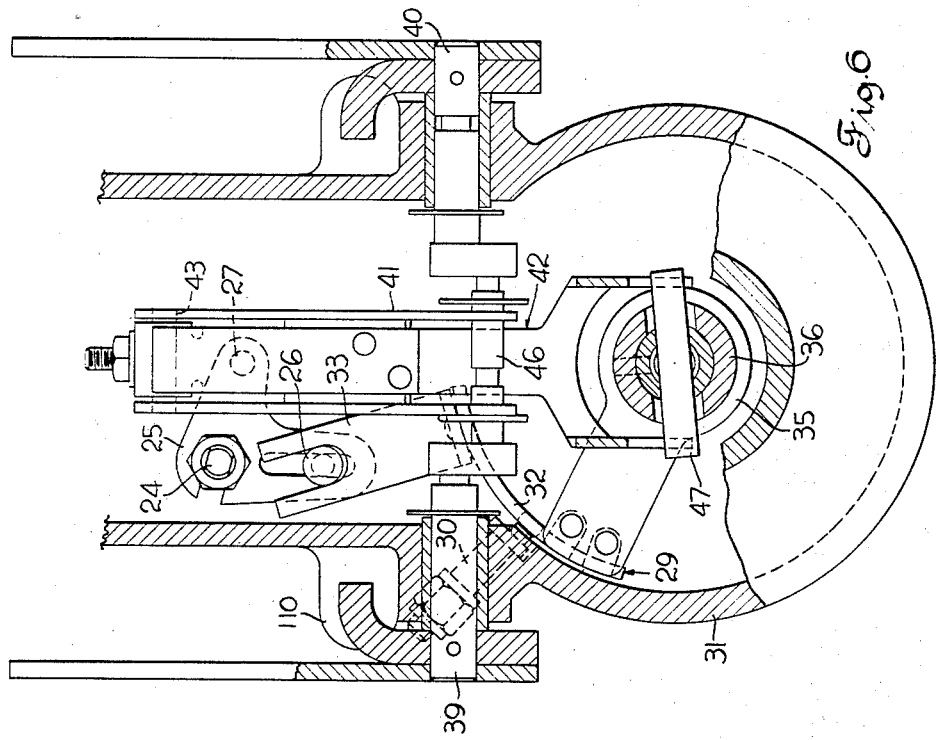
FIG. 6 is a cross section view viewing the end of the centrifugal governor and the mechanism for controlling the fuel delivery rate and timing mechanism.
Figure 5:
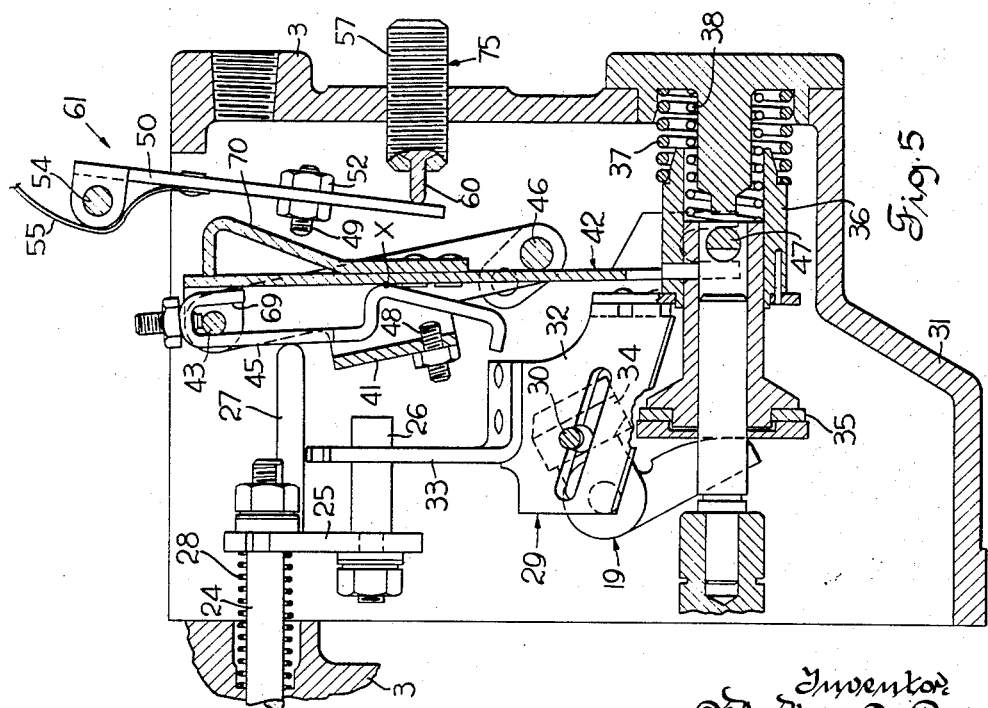
FIG. 5 illustrates a cross section view of the mechanism for controlling the fuel delivery rate and timing in the high idle position.
Figure 16:
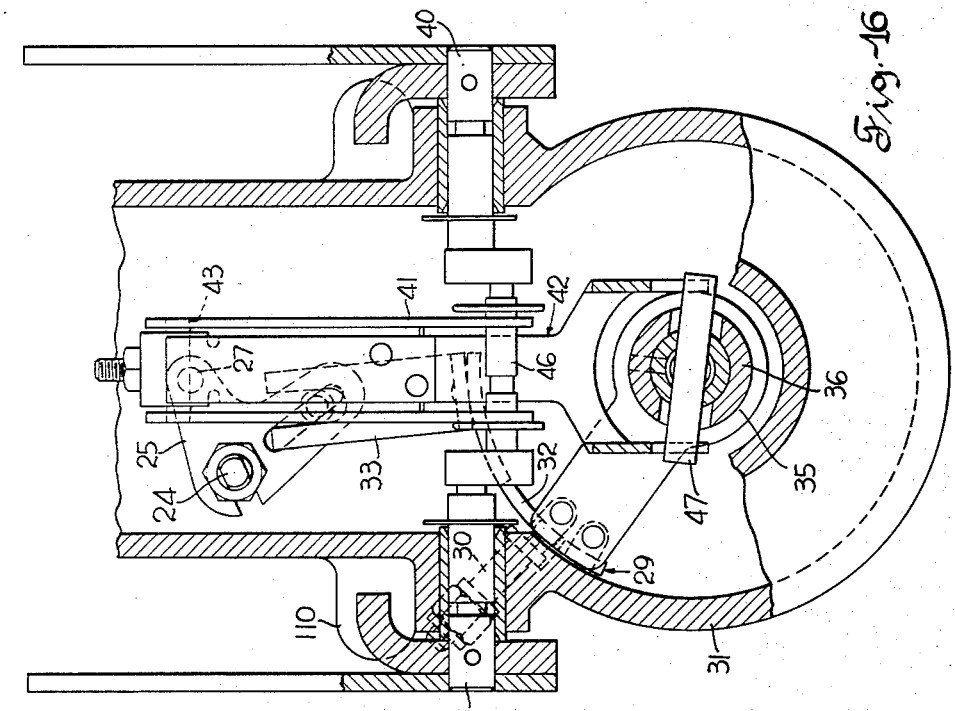
FIG. 16 is a cross section view taken at right angles to FIG. 15.
Figure 15:
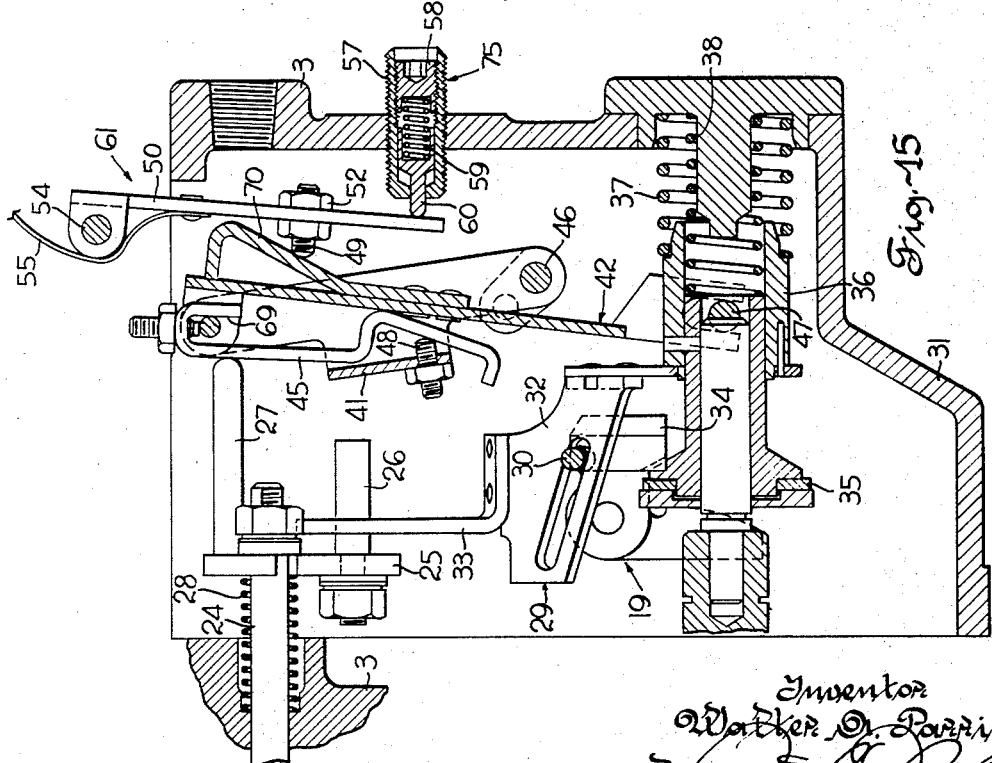
FIG. 15 is a cross sectional view of the fuel delivery control mechanism when the engine is at the start position.

The operation of the device will be described in the following paragraphs. The relative positions of the various parts of the device in the high idle position are shown in FIGS. 5 and 6. As the load is applied to the engine causing its speed to be reduced, the shifter 36 moves toward the flyweights 34 seeking a new position of equilibrium at reduced speed. This movement of the shifter 36 and slotted plate 32 simultaneously retards port closing through the timing mechanism and retards port opening by rotating the governor yoke assembly about the fulcrum of the pin 46 to urge the control finger 27 toward increasing fuel. If engine load is sufficient, this movement of shifter 36 and slotted plate 32 continues until the governor yoke assembly contacts the point on the adjusting screw 49. This is a condition of maximum torque available at "rated speed" and is illustrated by point B of FIG. 2. The relative position of the various components of the device at "rated speed" are illustrated in FIGS. 7 and 8.

Figure 3:
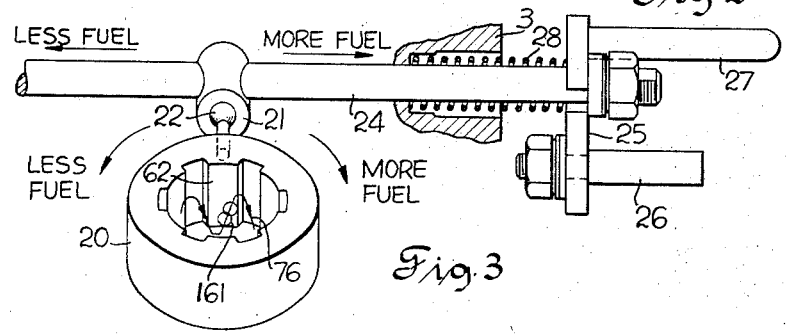
FIG. 3 illustrates a control sleeve controlling the timing and fuel delivery rate and the rod which operates the control sleeve.
Figure 4:
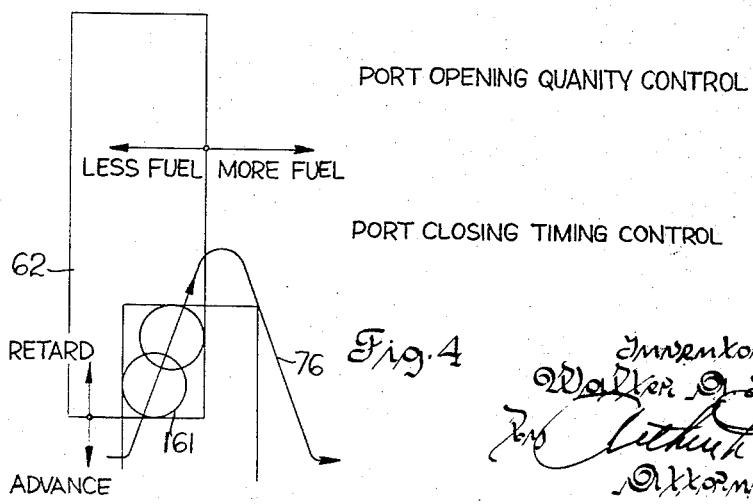
FIG. 4 illustrates the path of the spill port on the plunger of the fuel injection pump and a land on the inner periphery of the control sleeve.

Should the load increase and exceed the torque available at "rated speed" the engine will continue to slow down. Further movement of the shifter 36 will continue to retard port closing through the timing mechanism. The timing mechanism is illustrated in FIGS. 3 and 4 and the rotative movement of the sleeve 20 and the effect of this movement is illustrated in FIG. 3. The path of the port 161 is shown in FIG. 4 as the land 62 of sleeve 20 is moved downwardly. In other words, as sleeve 20 is moved downwardly, the port closing will occur at an earlier time and consequently the timing will be advanced. The rotation of the sleeve 20 is also illustrated to provide more or less fuel as indicated. The direction of the movement of the port 161 relative to the land 62 is indicated by the path 76 in FIGS. 3 and 4.

Assuming that the contact point of the fuel stop adjusting screw 49 is in its "low" position the port opening will continue to be retarded but at a reduced rate since the governor yoke assembly is no longer free to rotate about the lower pin 46. The shifter 36 movement now will urge the governor yoke 42 away from its contact with the lower pin 46. The governor yoke 42 will now pivot on the "low" contact point and at the same time rotate about the upper pin 43. Since the contact point "low" is below the elevation of the contact of control finger 27 there will be a reduced rate of control finger 27 movement toward increased fuel.

This movement will continue until torque adjusting screw 48 contacts peak torque plate 45. This position will produce the maximum permissible engine torque at reduced speeds. This point is illustrated as peak torque or point E on the graph illustrated in FIG. 2. If contact point 49 is at the same elevation as the contact of the control finger 27, then the movement of the governor yoke 42 toward the contact with torque adjusting screw 48 would produce no corresponding axial movement of the control finger 27. If the contact point of the fuel stop adjusting screw 49 is at its "high" position a control finger 27 movement toward decreased fuel will result during this torque movement. Thus it can be seen that a variable rate of torque rise may be achieved by the selection of the contact point elevation of adjusting screw 49 with the yoke 42.

This provides stable operating conditions for the engine and overcomes the possibility of stalling the engine and provides a means of adopting the engine characteristics to the load being applied to the engine.

As mentioned previously, the fuel control rate mechanism set forth in this application provides the additional feature for using multifuel and providing improved operation of the engine. Due to the direct relationship of variation in density to heat value of a fuel the viscosity is sensed by a fuel density or viscosity sensing compensator. The compensator is connected to the fuel delivery rate mechanism through the fuel stop assembly including hinged plates 80 as shown in FIG. 17 pivotally mounted on a crank 83 of shaft 84 connected to arm 85. Arm 85 is connected by link 81 to the piston rod 82. The piston rod 82 is slidably connected to the viscosity compensator.

The inlet conduit 74 is connected to a source of pressurized fuel. The pressurized fuel passes through a passage 85 through the pressure regulator 86 to provide a relatively constant pressure in the passage 87. The passage 87 is connected to openings through the chamber 88 below the piston 89 in the viscosity compensator 90. The piston rod 82 is connected to the piston 89 which operates the link 81. The regulated pressurized fluid in the passage 87 is also passed through the orifice 91 which reduces the pressure in the chamber 92. The orifice 93 has a different flow characteristic from the orifice 91 and accordingly causes a pressure in the chamber 92 dependent on viscosity as compared to the pressure of the fluid in chamber 88. The differential of fluid pressures of the two sides of the piston 89 cause a movement of the piston in response to the viscosity flowing through the valves 91 and 93. Accordingly, the piston moves to a state of equilibrium wherein the pressurized fluid in chamber 88 creates a force equal to the force of the pressurized fluid in chamber 92 and the force of the spring 94. This determines a position of the link 81 and accordingly the nut 95 and varies the fuel delivery rate in response to fuel viscosity.

A manual adjustment is provided wherein the bolt 96 may be rotated as it threadedly engages the nut 95 to adjust the nut up or down providing a manual adjustment of the pivot point for the fuel delivery rate mechanism.

An additional factor must be considered in the viscosity compensating mechanism. This factor is the ambient temperature which has an effect on the fuel viscosity. The orifices must be constructed in such a manner that the ambient temperature is compensated for. Accordingly, the needle 97 is constructed of a material having a high coefficient of expansion and the valve seat 98 is constructed of a material having a low coefficient of expansion. Accordingly, if the temperature increases the needle 97 will expand more rapidly than the valve seat 98 restricting the orifice 91 opening and preventing fluid from passing through the orifice as readily. The orifice 93 is constructed of a common material permitting a faster flow rate. It may be desirable to construct both orifices of di-metals to provide a specific viscosity control. Conversely, it is seen that with use of a metal of high coefficient of expansion of the needle 97 and a seat 98 having a low coefficient of expansion that the cooling of the ambient air will cause the orifice to open faster and allow the fuel to pass through the orifice 91 more readily. This in turn provides the desired compensation for a lower ambient temperature.

The applicant does not wish to claim any part of the viscosity compensator shown in FIGS. 17 and 18 above the link 81. The viscosity compensator is believed to be conventional and is shown merely to illustrate its use with the claimed fuel control linkage.

A modification of a control for fuel delivery responsive to an air density condition or pressure is disclosed in FIG. 19. The pressure sensed may be barometric pressure or pressure in a manifold of an internal combustion engine, etc. The manifold pressure condition sensed would provide a means of determining the air intake to the combustion chamber. Sensing the barometric pressure would provide a control responsive to the pressure condition in the atmosphere which also would affect the air intake through natural aspiration of the engine. In other words, sensing the pressure would provide a means for determining the amount of fuel required to be delivered to the combustion chamber to control the air fuel ratio and/or the efficiency of combustion in the chamber.

Referring to FIG. 19, a drum 100 containing a volume of gas at a predetermined pressure provides a sensing means for the ambient pressure condition of air surrounding the drum 100. The ambient pressure would be sensed by use of a rod 102 fixed to a flexible diaphragm 101 which would move axially responsive to changing ambient pressure conditions surrounding the drum 100. The axial movement of the diaphragm 101 and rod 102 would be transmitted to the arm 104 which pivots about a fulcrum in the arm support 103. The arm 104 provides a motion transmitting device to the arm 85 which rotates about a shaft center and creates an eccentric movement of the crank 83. This movement in turn is transmitted to the fuel stop assembly as disclosed in FIG. 17 and described above. Whatever condition is sensed by a mechanism such as described, the mechanism is designed to control the power output of the engine and also provide maximum efficiency of the engine to provide an optimum engine operating condition.

Figure 2:
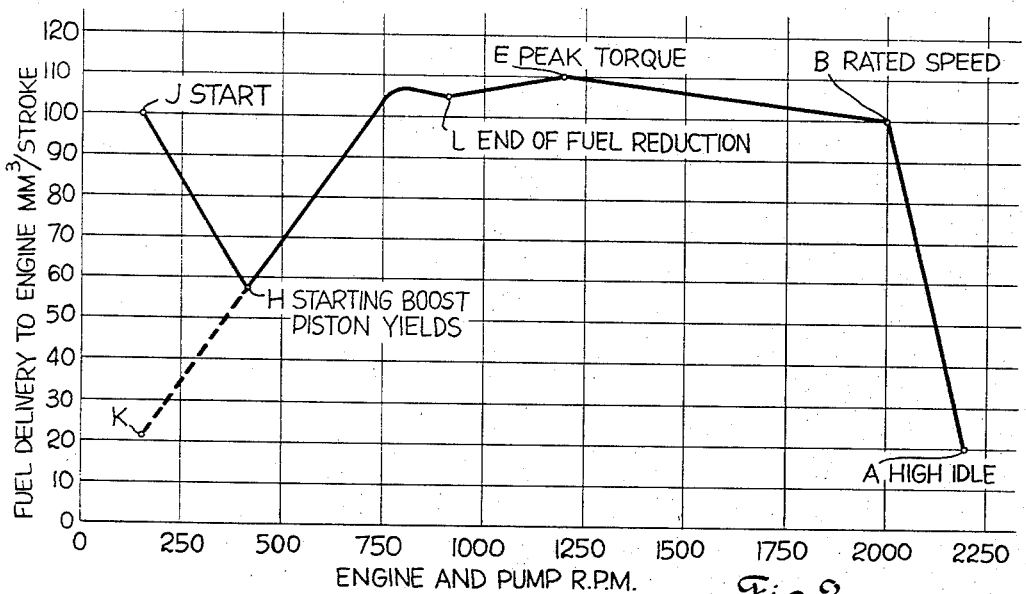
FIG. 2 illustrates a graph of the speed fuel delivery, or speed torque curve.

Referring to the engine characteristic curve shown in FIG. 2, the operation has been described with a decreasing speed from high idle to rated speed B point. It is desirable to drive the control finger 27 to decreasing fuel starting at point E. This is accomplished as the torque adjusting screw 48 on the torque link 41 closes the gap between the peak torque plate 45 and engages the peak torque plate 45. At point E the peak torque plate 45 begins to pivot at its fulcrum point X, FIG. 5.

As the peak torque plate 45 pivots about its fulcrum point X causing the upper end to pivot toward control finger 27, it causes a decrease in fuel rate as indicated between the points E and L on the graph shown in FIG. 2. As the flange 69 engages the right side of the shaft 43, all linkage movement stops, and the effective pumping stroke achieved at point L is maintained from point L to the point H, producing fuel delivery as indicated on the curve.

At the time the peak torque plate contacts the forward side of the shaft 43, the shifter movement will stop although the engine speed may continue to decrease. An increasingly unbalanced force from the governor springs 37, 38 will be imposed on the governor yoke 42 causing the starting boost piston 60 to be urged against the spring 59. At some selected speed safely below operating range this force will overcome preset load of the spring 59. This allows starting boost piston 60 to move against spring 59. This movement will be followed by the fuel stop assembly 61, the yoke 42 and the control finger 27, thus increasing the fuel delivery.

The wielding of the starting boost mechanism would occur as described if the engine were stalled to a stop with the throttle remaining in the full load position. Normal shutoff procedure would be to move the throttle lever to a lower setting limited by the control stop 110 against a stop. The shutoff control lever normally will override the internal linkages and drive the torque link and governor yoke and control finger to a full shutoff position.

At zero speed returning the throttle control lever 39 to the high speed position will again move the linkage to force the starting boost piston to yield and allow excess fuel to be pumped as an aid to starting. As engine speed increases, the force on the starting boost piston 60 will be reduced allowing it to return to its normal position and act as a stop on the maximum torque for governor speed.

During full throttle operation at speeds between rated speed B and peak torque E motion of the governor yoke 42 has been limited by its contact of the adjusting screw 49. The timing mechanism continues to retard the port closing, however, from point B to E it tends to decrease fuel delivery.

Due to decreasing centrifugal force of weights 34, governor springs 37, 38 are exerting an increasing force tending to rotate the governor yoke assembly about the pin 46 thus placing an increasing force against the starting boost piston 60 and spring 59. At point H this force will overcome the spring 59 and the starting boost piston 60 will begin to move, which in turn will allow the contact point of screw 49 and governor yoke assembly and control finger 27 to move toward an increasing fuel rate. Finally at cranking speed position J will be achieved instead of position K which would result without the starting boost mechanism.

An additional function is performed by the angle plate 70 of the governor yoke 42. As the throttle is moved from full throttle toward less fuel, a pin 46 will be lowered slightly. The governor yoke assembly will thus be lowered as will be the attached angle plate 70. As the angle plate is pulled down, maintaining contact with 49, it will urge the control finger 27 toward a decreased fuel position. Thus as throttle settings are changed for lower governed speed, less fuel will be available as the governor yoke 42 touches the contact point of screw 49. Thus fuel delivery at any part throttle full load position will be lower than fuel delivery at full throttle full load.

The preferred embodiments of this invention have been illustrated and described and will be defined by the attached claims.

The embodiments of the invention in which an exclusive property or privilege is claimed are defined as follows:

1. A fuel delivery control device in an internal combustion engine comprising, a governor operating in response to engine speed and transmitting movement to a governor driven member, a fuel delivery control member, means connecting said driven member to said fuel delivery control member for controlling the timing of fuel delivery to the engine, a mechanism connecting said driven member to said fuel delivery control member to control the quantity of fuel delivered to said engine including, a yoke connected to said driven member pivoting about a first axis initially when a load is applied to the engine and a second axis after a predetermined speed drop is encountered to provide predetermined increasing rates in fuel delivery, a torque plate on said yoke moving relative to said yoke providing a decrease in fuel delivery rate in response to further decrease in engine speed, a density condition sensing means connected to said mechanism to control the location of said second axis of rotation of said yoke thereby providing means for controlling fuel delivery to an internal combustion engine in response to speed of the engine and a density condition.

2. A fuel delivery control device as set forth in claim 1 wherein a fuel stop engages said yoke and defines the second axis of rotation when a predetermined speed drop is encountered by the engine.

3. A fuel delivery control device as set forth in claim 2 wherein said fuel stop is connected to said density condition sensing means and slidably supported to change the location of said second axis of rotation in response to the condition sensed for controlling the rate of fuel delivery.

4. A fuel delivery control device as set forth in claim 3 wherein said density condition sensing means senses the viscosity of the engine fuel delivered to said engine and provides an output movement applied to said mechanism to maintain substantially constant the total heat content per stroke of fuel delivery responsive to speed regardless of specific heat value of fuel.

5. A fuel delivery control device as set forth in claim 1 wherein the density condition sensing means is an air pressure responsive device sensing air pressure and controlling the location of the second pivotal axis and the fuel delivery rate to said engine when a predetermined speed drop is encountered by said engine.

6. A fuel delivery control device as set forth in claim 3 wherein said fuel stop is connected to said density condition sensing means through an eccentric arrangement whereby the linear movement transmitted from said density condition sensing means drives an eccentric fuel stop supporting means to change the location of the second axis of rotation of said mechanism and control the rate of fuel delivery to said engine.

7. A fuel delivery control device as set forth in claim 1 wherein said torque plate is pivotally mounted on said yoke and causes said fuel delivery control member to decrease the fuel delivery rate in response to a decrease in speed when the engine has reached its peak torque rating.

8. A fuel delivery control device as set forth in claim 3 wherein said fuel stop is slidably supported on a yieldable starter boost mechanism to provide an increased fuel delivery under starting conditions.

9. A fuel delivery control device comprising, a speed responsive governor transmitting movement to an output member responsive to engine speed, a fuel delivery control member for controlling the timing and quantity of fuel delivery to an internal combustion engine, a control rod means pivotally connecting said output member to said control member for controlling the timing of fuel delivery, a mechanism connected to said output member initially pivoting about a first axis when engine speed is reduced from high idle comprising, a yoke pivotally connected to said output member and pivotally engaging a throttle shaft, a link pivotally connected to said yoke and connected to said throttle shaft, a torque plate pivotally mounted for engagement with said yoke and said control rod means, a fuel stop means engaging said yoke to provide means for pivoting said yoke about a second axis of rotation when the engine has decreased to a predetermined speed, said mechanism thereby providing means for pivoting said yoke about a first axis defined by said throttle shaft to provide an increase in fuel delivery rate to said engine initially and subsequently about said fuel stop to provide a lesser increasing fuel delivery rate to control the torque output of said engine and provide a means of controlling timing and quantity of fuel delivery to said engine response to control by said governor.

10. A fuel delivery control device for operation in an internal combustion engine comprising, a centrifugal governor driven by said engine and drivingly connected to a rotatable and reciprocating element, a fuel delivery control member for controlling the timing and quantity of fuel delivered to the engine, a control rod pivotally and reciprocally mounted and engaging said control member, means rotatably connecting said element and said control rod to pivotally rotate said control rod and axially move said control member to control the timing of injection to said engine, a mechanism connecting said element to said control rod comprising, a yoke pivotally connected to said element, a link pivotally connected to said yoke and pivotally connected to a throttle shaft, a torque plate pivotally mounted and engaging said control rod to transmit axial movement to said control rod for controlling the quantity of fuel delivered to said engine, a fuel stop slidably engaging said yoke, a viscosity compensator sliding said fuel stop in response to the viscosity of fuel delivered to said engine, said mechanism thereby pivoting about its first axis defined by said throttle shaft when a load is initially placed on said engine and pivoting about the second axis defined by said fuel stop when predetermined load is encountered by said engine.

References Cited
UNITED STATES PATENTS

| | | | |
|---|---|---|---|
| 2,384,340 | 9/1945 | Reggio | 123—140 |
| 2,813,523 | 11/1957 | Bischoff | 123—139 |
| 2,947,299 | 8/1960 | Shallenberg et al. | 123—140 |
| 3,312,209 | 4/1967 | Chmura | 123—140 |
| 3,217,700 | 11/1965 | Huse | 123—140 |
| 3,313,282 | 4/1967 | Dreisin | 123—139 |

WILLIAM L. FREEH, *Primary Examiner.*

U.S. Cl. X.R.

123—140; 103—2, 37